March 6, 1928.
F. O. LIBBY
1,661,766
OVEN FOR BAKING BEANS AND THE LIKE
Filed Feb. 23, 1924
5 Sheets-Sheet 1
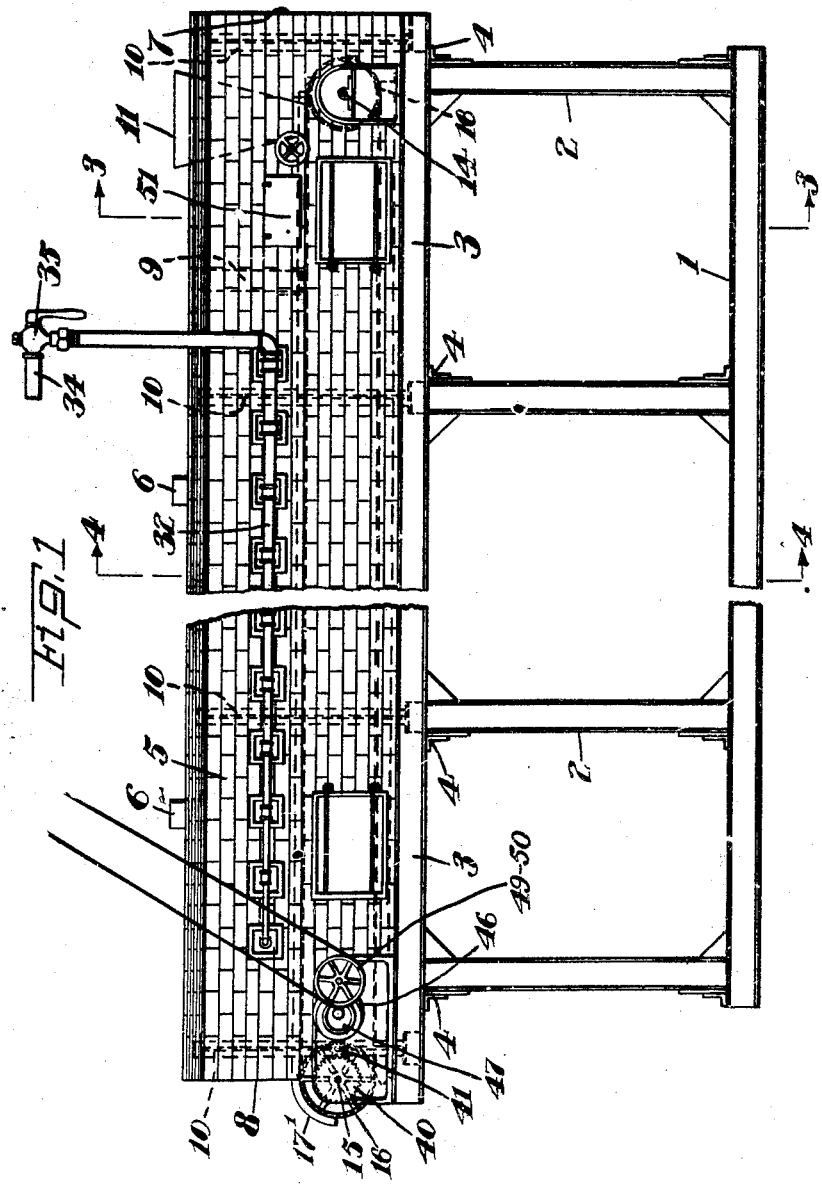
Inventor
Francis O. Libby
By [signature]
Attorney

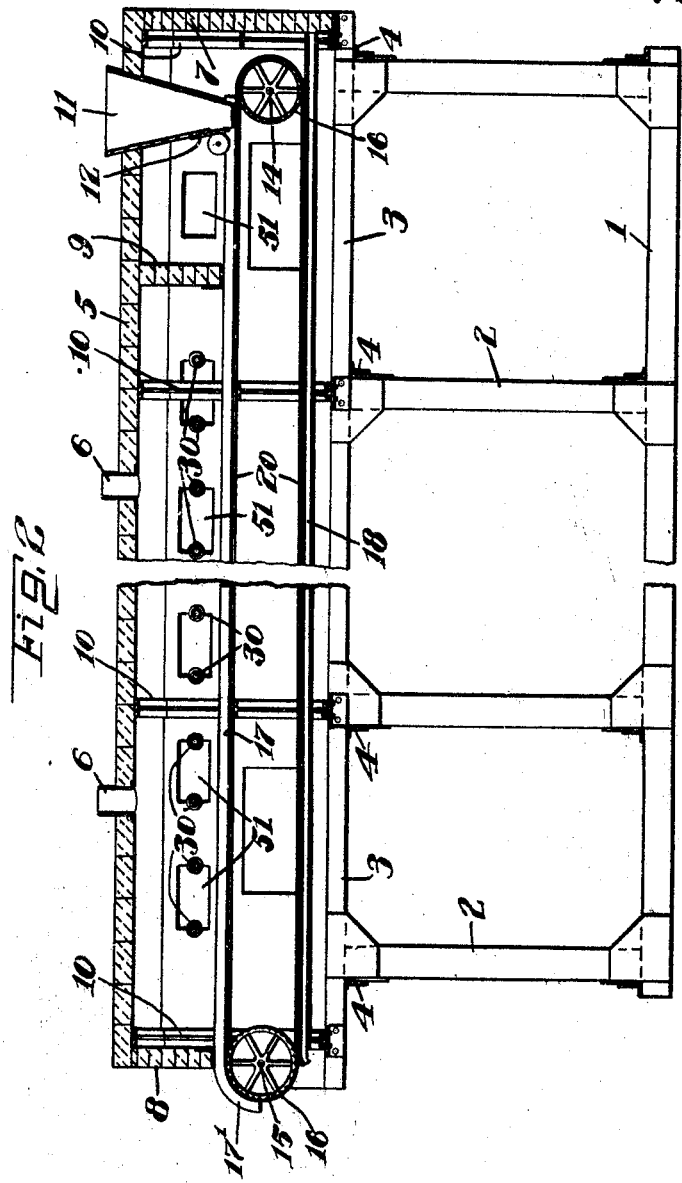

March 6, 1928.  1,661,766
F. O. LIBBY
OVEN FOR BAKING BEANS AND THE LIKE
Filed Feb. 23, 1924   5 Sheets-Sheet 3
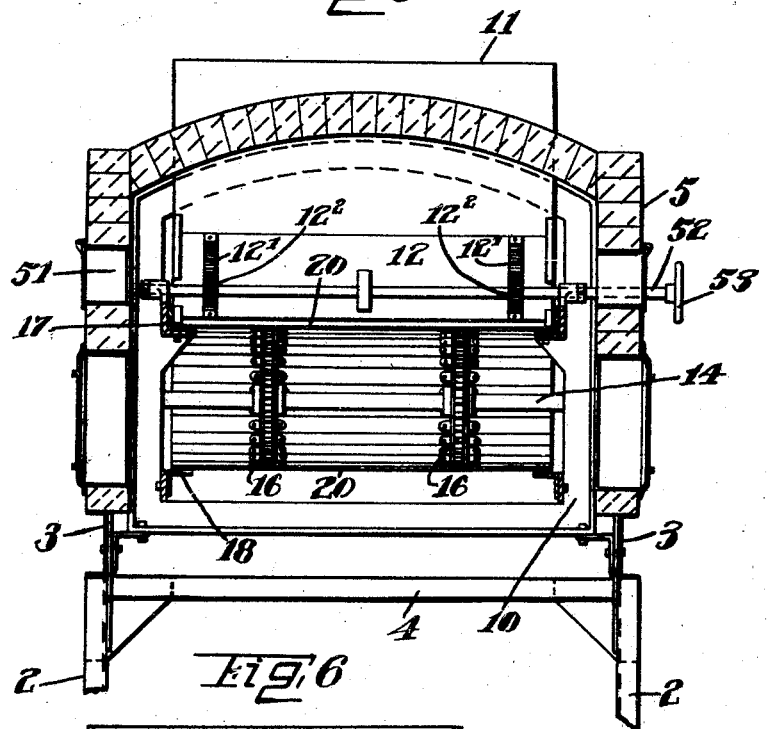
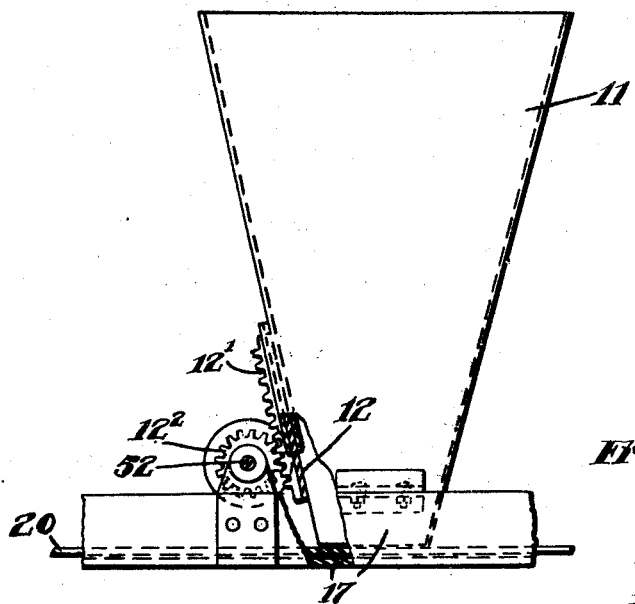
Inventor
Francis O. Libby
By Attorney March 6, 1928.  1,661,766
F. O. LIBBY
OVEN FOR BAKING BEANS AND THE LIKE
Filed Feb. 23, 1924  5 Sheets-Sheet 4
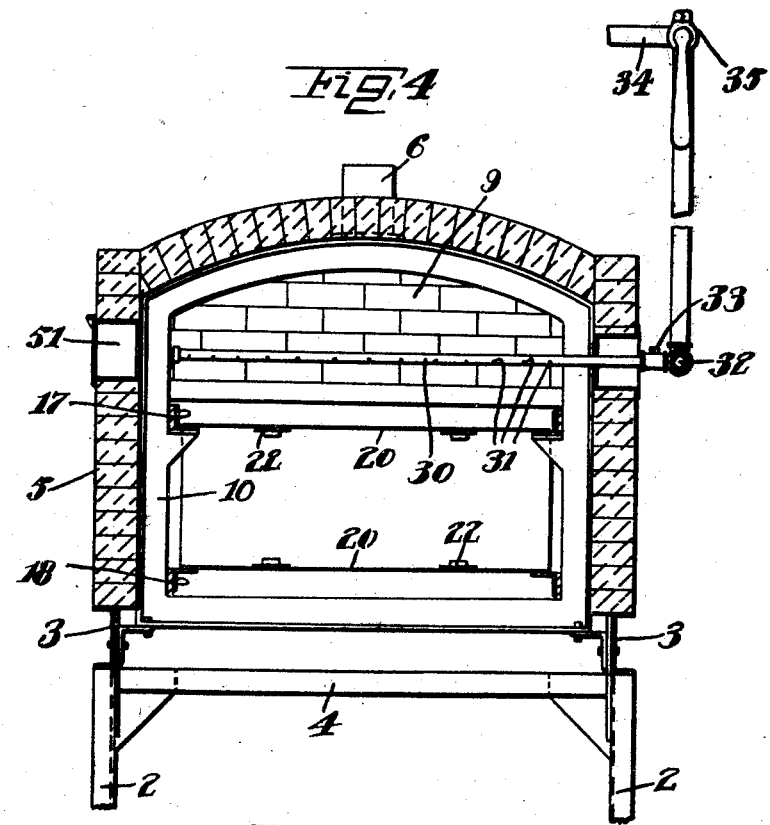
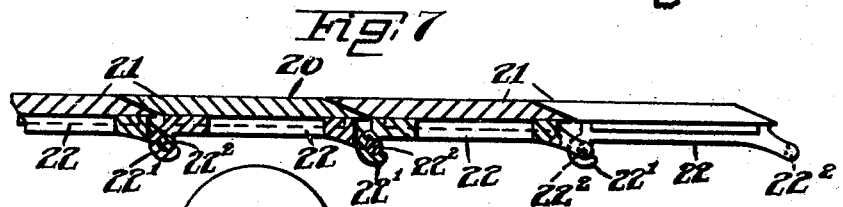
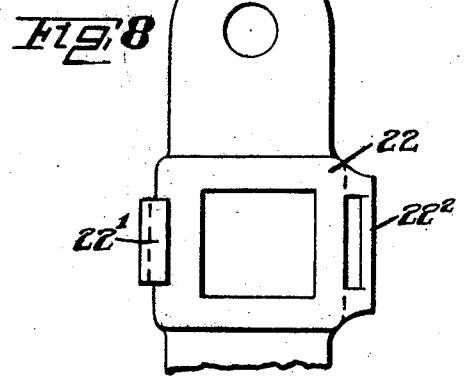
Inventor
Francis O. Libby
By Attorney

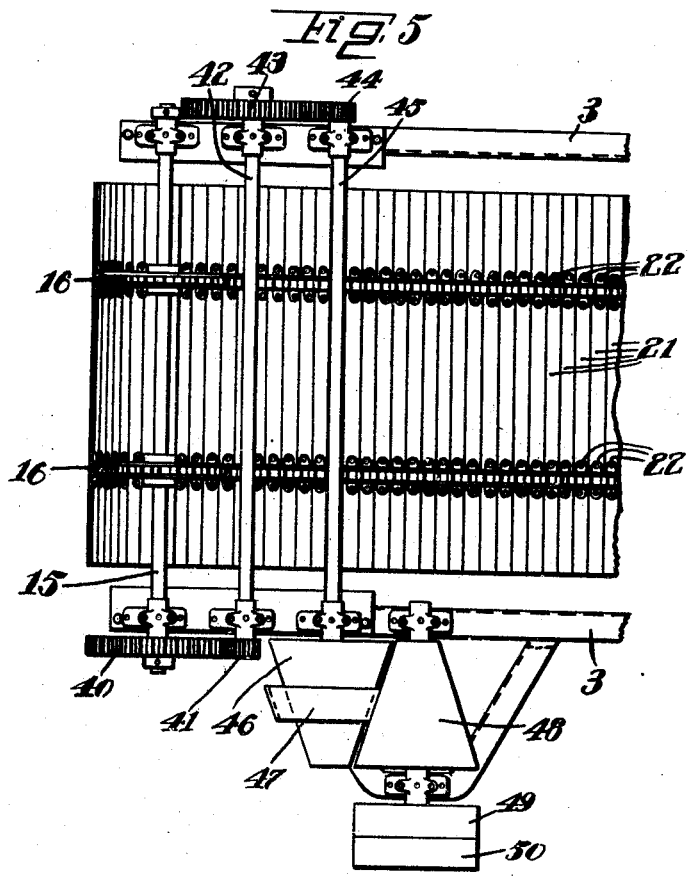

Patented Mar. 6, 1928.

1,661,766

UNITED STATES PATENT OFFICE.

FRANCIS O. LIBBY, OF PORTLAND, MAINE, ASSIGNOR TO THE TWITCHELL-CHAMPLIN COMPANY, OF PORTLAND, MAINE, A CORPORATION OF MAINE.

OVEN FOR BAKING BEANS AND THE LIKE.

Application filed February 23, 1924. Serial No. 694,494.

This invention relates to ovens and particularly to an oven of the continuous type. In the form selected for illustrative purposes herein it is particularly adapted for the baking of beans for canning and while many features of my invention are adapted for use for other purposes, the particular combinations and details set forth are of very great value and importance in the baking of beans.

Prior to my invention in this line it was, I believe, not known that beans could be actually baked by any continuous process adapted to bear a part in relation to a canning operation. In fact, many so-called baked beans were not baked at all and the marking of such as baked was ultimately forbidden. The desirability of actually baking has been long recognized as best preparing the bean for human consumption, but it has been thought that such a process must of necessity be a slow one.

I have found that with my oven as illustrated I am able to bake beans as well if not better than in the old slow batch method of handling them. In fact, the rapidity with which the beans are superheated seems to produce an unusual softening of the cellulose so that the beans can be easily masticated and thus rendered more readily attacked by the digestive processes. Furthermore, the protein content seems to be better cooked and in a more digestible and palatable form. Furthermore, the product of my oven seems to have a maximum expansion of the starch grains, and I believe, a transformation of a maximum amount of the granulose of the starch whereby it is rendered readily convertible by the saliva and pancreatic juices to form the much desired maltose and dextrin.

It is obvious that the handling of any such a vegetable as the bean in bulk, involves considerable difficulty, especially when it is necessary to consider the rather delicate requirements not only as to cooking, but as to its physical form and condition.

I have provided in accordance with my invention for so handling beans continuously and in bulk and in so timing their cooking that not only are the beans in the finest state of preservation as to form or in the most satisfactory state as to cooking, but I am able to carry on the operation at a speed which enables me to make a step in regular commercial canning.

The construction and operation of the oven chosen for illustration is shown in the accompanying drawings to which reference is made by the use of the usual conventional characters. In the drawings:

Fig. 1 is a side elevation of an oven in accordance with my invention.

Fig. 2 is a longitudinal section through the same.

Fig. 3 a transverse section on the line 3—3, Fig. 1.

Fig. 4 a similar section on the line 4—4, Fig. 1.

Fig. 5 is a horizontal partial section through the driving end of the conveyor.

Fig. 6 is an enlarged side view partly in section of the hopper and a portion of the conveyor.

Fig. 7 an enlarged sectional view of a section of the conveyor, and

Fig. 8 an enlarged view of one of the conveyor links.

In the form illustrated my oven is preferably elevated on a frame work comprising a base 1, upright columns 2, and a carrying frame 3. On the frame 3 which is braced across by the beams 4 I lay up a brick oven or tunnel 5 open at its bottom and having a transversely arched roof penetrated at intervals by ventilators 6. One end of the oven or tunnel is completely closed as at 7 and at the opposite end partially closed as at 8. The oven is also provided adjacent the end 7 with a screening wall 9 and is internally braced at intervals as at 10.

The type of oven shown is, as stated, intended primarily for baking beans for canning and it may be noted that such an oven is of considerable length, i. e., some sixty or seventy feet. The length of the oven may, of course, be varied, but this is mentioned in order that the drawings which are necessarily shortened by an indicated break in the middle, will be better understood.

The oven is penetrated at one end by a hopper 11 controlled by a gate or valve 12. At the ends of the oven are provided transverse shafts 14 and 15. The shaft 14 is within the end wall 7 while the shaft 15 is set only partly within the wall 8 so that the sprockets 16 extend beyond the vertical plane of the wall 8 to provide for the delivery.

Along the sides of the oven and supported by the frames 10 are two pairs of angle irons 17 and 18. The upper angle irons 17 are laid with one flange extending upward so as to form a guide for the edges of the conveyor 20 and also a lateral retaining strip for the beans spread out on the conveyor so as to prevent lateral spilling.

Just above the conveyor are disposed at intervals a series of transverse burners 30 having burner vents 31. These are fed through a longitudinal main 32 which diminishes longitudinally of the machine. Each one of the transverse burners is controlled by a valve 33 and the main supply 34 is controlled by a valve 35. By these controls the heat at each transverse burner may be regulated so as to secure either a progressive adjustment of heat at the successive burners, or, if desired, an absolute uniformity throughout.

The conveyor comprises preferably a series of narrow strips 21 each provided with a pair of hook plates 22 which interlock each with the next adjacent and which also give driving engagement with the sprocket 16. These strips 21 are oppositely beveled slightly on front and rear edges so that when the conveyor is running flat the rear edge of each strip 21 overlaps the forward edge of the next succeeding strip so as to make a tight joint thus supporting the beans on a smooth practically seamless surface during the period that they are subjected to the heat. The hook plates 22 are screwed to the underside of the strips as appears in Figs. 7 and 8 and are provided as above stated with a hook element indicated at $22^1$ and a hook receiving element $22^2$, so that the belt may be flexibly assembled.

The shaft 15 at the delivery end of the machine is the driving shaft for the sprocket 16 and is geared through a large gear 40 to a driving pinion 41 on a countershaft 42 which is again geared down by a larger gear 43 driven by a smaller pinion 44 on a shaft 45. The shaft 45 carries a cone pulley 46 which through an adjustable belt 47 is driven by a reversed cone 48. The cone 48 is driven by a fast pulley 49 the usual loose pulley 50 being provided for idling the belt drive. In this way the speed of the conveyor can be regulated and varied.

The baking of the beans may be not only observed by the product delivered at the delivery end of the machine but may also be observed through the ports 51 with which the oven is provided for observation and for the lighting of the burners and other general purposes of inspection and adjustment.

The upper angle guides 17 are bent down at the delivery end as indicated at $17^1$ thus providing with the conveyor as it turns about the sprocket 16 a delivery chute from which the beams are delivered in their oven baked condition.

Referring now to the feed end of the machine it will be seen that the open bottom hopper 11 has its gate 12 controlled by a rack and pinion $12^1$, $12^2$. The pinion $12^2$ is on a cross shaft 52. A hand wheel 53 is provided externally of the oven so that the flow can be regulated to deliver to the conveyor 20 a uniform thin layer of beans. The hopper 11 is fed in any suitable manner to maintain a reasonably constant gravity feed and the partition wall 9 has its lower edge at an elevation above the conveyor 20 just sufficient to clear the maximum depth of the beans to be baked.

The vents 31 and the cross burners 30 are drilled at a slight side angle so as to deliver the jets of flame in such a way as to evenly distribute the heat between the burners. In operation the burners are lighted and the flames of the individual burners adjusted by the valves 33, the general pressure being regulated at 35. The conveyor is then started and the oven warmed up to a suitable temperature. The hopper 11 is then filled and the gate 12 raised until a desired flow of the beans on the conveyor surface is established.

Baking will then continue steadily, the only requirement being reasonable inspection of the delivered product and occasional inspection of the oven at different parts to maintain an assurance of uniformity in the progressive baking as the beans pass through.

By such an oven I am able to effect a baking which is, I believe, entirely novel and which is of unusual efficiency both in economy in operation and in quality of product. The beans baking rapidly as they do under a progressive and cumulative heat are internally cooked before the absorbed water has been driven off. Furthermore, by the regulation of heat and time I am able to so exactly bake my beans that I can produce them in a state in which the supplemental heat of canning will exactly bring the beans to a state of perfection which has been heretofore most difficult to obtain and almost impossible to attain in regular standard products.

Various modifications may obviously be made in the construction of the oven and in the details of burners and conveyors. These elements as shown herein are efficient and satisfactory but may obviously be varied by those skilled in the art if the principles and combinations defined in the accompanying claims be adhered to.

What I therefore claim and desire to secure by Letters Patent is:—

1. In an oven for baking beans and the like, an elongated chamber, a plurality of burners disposed in the upper part thereof, means for regulating said burners, flanged retaining guides extending longitudinally of said chamber, an endless conveyor comprising a plurality of transversely disposed plates having close lateral bearing at their ends on said guides, means for driving the conveyor, a hopper at one end of said oven and having a delivery port closely adjacent the upper surface of said conveyor, the said flanged guides being bent down at the opposite end of the oven to form with the plates of the conveyor a curved delivery chute.

2. In an oven for baking beans or the like, an elongated open bottom chamber, heaters arranged in the upper part thereof, flanged retaining guides extending longitudinally of said chamber, an intake at one end of said chamber, said guides projecting beyond the opposite end of said chamber, an endless conveyor comprising a plurality of transversely disposed plates each having a close lateral bearing on said guides within the flanges thereof, the return of said conveyor being exposed outside of said oven and means for driving said conveyor at a predetermined speed.

3. In a continuous oven of the class described, a pair of longitudinal rails each having a horizontal and an upturned flange, and an endless conveyor comprising a plurality of marginally overlapped transverse plates, the under sides of the end portions of said plates being flat and bearing on the horizontal flanges of said rails and extending closely adjacent the said vertical flanges whereby said rails support the said plates and laterally confine the material thereon, and a plurality of burners disposed adjacent the upper surface of said conveyor.

4. In a continuous oven of the class described, an elongated chamber, heaters arranged in the upper part thereof, angle guides extending longitudinally of said chamber, a transversely jointed endless conveyor comprising a plurality of narrow strips having rearwardly overlapping edges and each having lateral bearing on said guides and within the flanges thereof, a receiving hopper at one end of said conveyor, said conveyor being extended beyond said chamber at the opposite end from the chute, the said rails being bent externally of said chamber to follow the turn of the conveyor for a delivery.

5. A new oven for baking beans for canning, comprising an elongated chamber, a conveyor comprising a plurality of closely jointed plates, means for supporting said plates adjacent their ends, including a retaining flange longitudinally of the chamber to hold thereon a thin layer of beans without lateral spilling, the under sides of the end portions of said plates being flat and bearing on the retaining flange of said plate supporting means, and means for controlling the speed of the conveyor and the heaters whereby a predetermined progressive cooking is attained.

In testimony whereof I affix my signature.

FRANCIS O. LIBBY.